US010597530B2

(12) United States Patent
Rosenquist et al.

(10) Patent No.: US 10,597,530 B2
(45) Date of Patent: Mar. 24, 2020

(54) POLYCARBONATE COMPOSITIONS WITH IMPROVED FLAME RETARDANCE

(71) Applicant: SABIC GLOBAL TECHNOLOGIES B.V., Bergen op Zoom (NL)

(72) Inventors: Niles Richard Rosenquist, Evansville, IN (US); James Franklin Hoover, Evansville, IN (US); Manojkumar Chellamuthu, Newburgh, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 146 days.

(21) Appl. No.: 15/742,933

(22) PCT Filed: Jun. 7, 2016

(86) PCT No.: PCT/US2016/036208
§ 371 (c)(1),
(2) Date: Jan. 9, 2018

(87) PCT Pub. No.: WO2017/007562
PCT Pub. Date: Jan. 12, 2017

(65) Prior Publication Data
US 2018/0223097 A1    Aug. 9, 2018

Related U.S. Application Data

(60) Provisional application No. 62/190,292, filed on Jul. 9, 2015.

(51) Int. Cl.
| | | |
|---|---|---|
| *C08L 69/00* | (2006.01) | |
| *C08K 5/00* | (2006.01) | |
| *C08G 64/06* | (2006.01) | |
| *C08K 5/42* | (2006.01) | |

(52) U.S. Cl.
CPC .............. *C08L 69/00* (2013.01); *C08G 64/06* (2013.01); *C08K 5/0066* (2013.01); *C08K 5/42* (2013.01); *C08L 2201/02* (2013.01); *C08L 2205/02* (2013.01); *C08L 2205/025* (2013.01); *C08L 2205/03* (2013.01)

(58) Field of Classification Search
CPC .. C08L 69/00; C08L 2205/03; C08L 2201/02; C08L 2205/025; C08K 5/42; C08G 64/06
USPC ........................................................ 524/158
See application file for complete search history.

(56) References Cited

U.S. PATENT DOCUMENTS

| | | | |
|---|---|---|---|
| 3,933,734 A | 1/1976 | Mark et al. | |
| 4,788,274 A | 11/1988 | Rosenquist | |
| 4,912,194 A | 3/1990 | Rosenquist | |
| 4,927,914 A * | 5/1990 | Rosenquist | C08G 64/14 525/463 |
| 4,960,839 A | 10/1990 | Rosenquist | |
| 4,960,863 A * | 10/1990 | Rosenquist | C08G 63/64 525/463 |
| 4,973,665 A | 11/1990 | Rosenquist | |
| 4,999,408 A | 3/1991 | Rosenquist | |
| 5,064,914 A * | 11/1991 | Rosenquist | B29C 67/246 525/439 |
| 5,081,205 A | 1/1992 | Rosenquist | |
| 6,462,111 B1 * | 10/2002 | Singh | C08K 5/02 524/108 |
| 7,671,164 B2 | 3/2010 | Brack et al. | |
| 2009/0062438 A1 | 3/2009 | Van De Grampel et al. | |
| 2010/0069543 A1 | 3/2010 | Monden et al. | |
| 2012/0252985 A1 | 10/2012 | Rosenquist et al. | |
| 2014/0066556 A1* | 3/2014 | Kulkarni | C08K 5/523 524/140 |
| 2014/0272691 A1 | 9/2014 | Calveras et al. | |

FOREIGN PATENT DOCUMENTS

| | | |
|---|---|---|
| EP | 0372308 A2 | 6/1990 |
| EP | 0372323 A2 | 6/1990 |
| EP | 2103654 A1 | 9/2009 |
| KR | 101367088 B1 | 3/2014 |

OTHER PUBLICATIONS

International Search Report for International Application No. PCT/US16/36208, International Filing Date Jun. 7, 2016, dated Aug. 25, 2016, 6 pages.
Levchik et al., "Flame Retardants in Commercial Use or in Advanced Development in Polycarbonates and Polycarbonate Blends", Journal of Fire Sciences, vol. 24, Issue 2, Mar. 2006, 15 pages.
Written Opinion for International Application No. PCT/US16/36208, International Filing Date Jun. 7, 2016, dated Aug. 25, 2016, 6 pages.

* cited by examiner

*Primary Examiner* — Hui H Chin
(74) *Attorney, Agent, or Firm* — Cantor Colburn LLP (57) ABSTRACT

Polycarbonate compositions with high flame retardance are disclosed. The compositions include a polycarbonate having repeating units derived from a monomer with an ester side group, and also include a flame retardant additive. These compositions may be further blended with another polycarbonate. The resulting compositions have high flame retardance and improved anti-drip properties.

21 Claims, 1 Drawing Sheet

POLYCARBONATE COMPOSITIONS WITH IMPROVED FLAME RETARDANCE

CROSS REFERENCE TO RELATED APPLICATIONS

This application is a National Stage application of PCT/US16/36208, filed Jun. 7, 2016, which claims the benefit of U.S. Provisional Application No. 62/190,292, filed Jul. 9, 2015, both of which are incorporated by reference in their entirety herein.

BACKGROUND

The present disclosure relates to polycarbonate compositions that have increased flame retardance. Generally, the compositions include a polycarbonate polymer that has ester side groups, and also include a flame retardant additive.

Polycarbonates (PC) are thermoplastic resins with many desirable properties, but are not inherently non-flammable. The UL 94 V0/V1 flammability test includes both short flame out times and no dripping of flaming particles as pass/fail requirements. Polycarbonates tend to drip when exposed to a flame, and this behavior worsens as the wall thickness decreases. Anti-drip technology is usually required when the samples being tested are thin gauge and/or are prepared from resins with a high melt volume rate (MVR). The market is also moving towards articles having thin walls for purposes of slimness, weight reduction, and size reduction of the overall final product, as well as more complex designs.

It would be desirable to provide polycarbonate compositions that have improved performance, transparency, and high flow, and have high flame retardance even in thin-wall applications. Desirable features of such materials include excellent physical and optical properties, aging performance, and an adequate processing window.

BRIEF DESCRIPTION

Disclosed in various embodiments, are flame retardant compositions, comprising: a first polycarbonate polymer having repeating units derived from a monomer having the structure of Formula (A) or Formula (B):

Formula (A)

Formula (B)

wherein R and R' are $C_2$-$C_{15}$ alkyl; m, n, p, and q are each 0 or 1, m+n=1, and p+q=1; and E is $C_1$-$C_{15}$ alkyl.

In particular embodiments, the first polycarbonate polymer is a copolymer. The first polycarbonate polymer can further comprise repeating units derived from bisphenol-A. Sometimes, the first polycarbonate polymer further comprises repeating units derived from a branching agent, so that a branched polycarbonate results. The first polycarbonate polymer may contain from about 0.25 mole % to about 25 mole % of the repeating units derived from the monomer of Formula (A) or Formula (B).

The first polycarbonate polymer may have a weight-average molecular weight of from about 10,000 to about 50,000, or preferably about 18,000 to about 35,000.

In some embodiments, the flame retardant composition further comprises a second polycarbonate polymer. The second polycarbonate polymer can be a bisphenol-A homopolymer. Alternatively, the second polycarbonate polymer can be a copolymer containing repeating units derived from bisphenol-A and from tetrabromobisphenol-A. The second polycarbonate polymer may contain from about 15 wt % to about 30 wt % of bromine.

In yet other embodiments, the second polycarbonate polymer also has repeating units derived from the monomer of Formula (A) or Formula (B), and the first polycarbonate polymer has a higher weight-average molecular weight than the second polycarbonate polymer.

The weight ratio of the first polycarbonate polymer to the second polycarbonate polymer may be from about 15:85 to about 99:1. Alternatively, when a second polycarbonate polymer is present, the repeating units derived from the monomer of Formula (A) or (B) (usually from the first polycarbonate polymer) are from about 0.25 mole % to about 5 mole % of the composition.

In still other embodiments, the flame retardant composition further comprises: a second polycarbonate polymer which is a bisphenol-A homopolymer; and a third polycarbonate polymer which is a copolymer containing repeating units derived from bisphenol-A and from tetrabromobisphenol-A. The flame retardant composition may contain from about 20 parts to about 80 parts by weight of the first polycarbonate polymer; from about 10 parts to about 60 parts by weight of the second polycarbonate polymer; and from about 1 part to about 2 parts by weight of the third polycarbonate polymer.

The flame retardant composition may contain from about 0.05 wt % to about 0.5 wt % of the flame retardant additive. The flame retardant additive can be a salt of diphenylsulfone-3-sulfonic acid or a salt of perfluorobutane sulfonic acid.

The flame retardant composition achieves several useful properties. An article molded from the thermoplastic composition can attain UL94 V0 performance at a thickness of 2.0 mm, or at a thickness of 1.5 mm. The flame retardant composition may have a melt volume rate (MVR) of from about 3 $cm^3$/10 min to about 25 $cm^3$/10 min, when measured according to ASTM D1238-10, 6 minute dwell. Combinations of these properties are also contemplated.

These and other non-limiting characteristics are further described below.

BRIEF DESCRIPTION OF THE FIGURES

The following drawing is presented to illustrate the exemplary embodiments disclosed herein and not to limit them.

DETAILED DESCRIPTION

In the following specification, the examples, and the claims which follow, reference will be made to some terms which are defined as follows.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values for polymers or polymer compositions reflect average values. All numerical values used herein include values that are the same when reduced to the same number of significant figures and values that differ by less than the experimental error of conventional techniques for measuring that value.

All ranges disclosed herein are inclusive of the recited endpoint and independently combinable (e.g., "from 2 grams to 10 grams" includes the endpoints, 2 grams and 10 grams, and all the intermediate values). Each intermediate number with the same degree of precision is explicitly contemplated, e.g. for the range of 6-9, the numbers 7 and 8 are also explicitly contemplated.

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

Compounds are described using standard nomenclature. Any position not substituted by an indicated group is understood to have its valency filled by a bond or a hydrogen atom. A dash ("-") that is not between two letters indicates a point of attachment for a substituent, e.g. —CHO attaches through the carbon atom.

The term "aliphatic" refers to an array of atoms that is not aromatic. The backbone of an aliphatic group is composed exclusively of carbon. An aliphatic group is substituted or unsubstituted. Exemplary aliphatic groups are ethyl and isopropyl.

An "aromatic" radical has a ring system containing a delocalized conjugated pi system with a number of pi-electrons that obeys Hückel's Rule. The ring system may include heteroatoms (e.g. N, S, Se, Si, O), or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "alkyl" refers to a fully saturated radical composed entirely of carbon atoms and hydrogen atoms. The alkyl radical may be linear, branched, or cyclic. The term "aryl" refers to an aromatic radical composed exclusively of carbon and hydrogen. Exemplary aryl groups include phenyl, naphthyl, and biphenyl. The term "hydrocarbon" refers to a radical which is composed exclusively of carbon and hydrogen. Both alkyl and aryl groups are considered hydrocarbon groups.

The terms "cycloaliphatic" and "alicyclic" refer to an array of atoms which is cyclic but which is not aromatic. The cycloaliphatic group may include heteroatoms such as N, S, Se, Si, and O, or may be composed exclusively of carbon and hydrogen. A cycloaliphatic group may comprise one or more noncyclic components. For example, a cyclohexylmethyl group ($C_6H_{11}CH_2$) comprises a methylene group (the noncyclic component). Exemplary cycloaliphatic groups include cyclopropyl, cyclobutyl, 1,1,4,4-tetramethylcyclobutyl, piperidinyl, and 2,2,6,6-tetramethylpiperydinyl.

An "ester" radical has the formula —CO—O—, with the carbon atom and the oxygen atom both bonded to carbon atoms. A "carbonate" radical has the formula —O—CO—O—, with the oxygen atoms both bonded to carbon atoms. Note that a carbonate group is not an ester group, and an ester group is not a carbonate group.

The term "substituted" refers to at least one hydrogen atom on the named radical being substituted with another functional group, such as halogen, —CN, or —$NO_2$. However, the functional group is not hydroxyl, carboxyl, ester, acid halide, or anhydride. Besides the aforementioned functional groups, an aryl group may also be substituted with alkyl or alkoxy. An exemplary substituted aryl group is methylphenyl.

The term "copolymer" refers to a polymer having two or more repeating units derived from different monomers. A homopolymer has only one repeating unit.

The term "Melt Volume Rate" (MVR) or "Melt Flow Rate" (MFR)" refers to the flow rate of a polymer in a melt phase using the method of ASTM D1238-10. MVR is expressed in cc per 10 minutes, and MFR is expressed in grams per 10 minutes.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to form such stable covalent bonds.

The present disclosure relates to polycarbonate compositions which have improved flame retardance. The compositions contain (i) a first polycarbonate polymer having ester side groups and (ii) a flame retardant additive. The ester side groups are designed to inhibit dripping by crosslinking the resin at a critical time when the polycarbonate is beginning to melt and flow, i.e. prior to dripping. In additional embodiments, the compositions can further comprise (iii) a second polycarbonate polymer; and (iv) a third polycarbonate polymer.

As used herein, the terms "polycarbonate" and "polycarbonate polymer" mean compositions having repeating structural carbonate units of the formula (1):

(1)

in which at least about 60 percent of the total number of $R^1$ groups are aromatic organic radicals and the balance thereof are aliphatic, alicyclic, or aromatic radicals. In one embodiment, each $R^1$ is an aromatic organic radical, for example a radical of the formula (2):

(2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, and isopropylidene. The bridging radical $Y^1$ may be a hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include compounds of formula (3)

(3)

wherein $Y^1$, $A^1$ and $A^2$ are as described above. Also included are bisphenol compounds of general formula (4):

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group; $R^e$ is a divalent hydrocarbon group; $R^f$ is a monovalent linear hydrocarbon group; and r is an integer from 0 to 5.

Specific examples of the types of bisphenol compounds that may be represented by Formula (4) include 2,2-bis(4-hydroxyphenyl) propane (hereinafter "bisphenol-A" or "BPA"); 4,4'-(1-phenylethane-1,1-diyl)diphenol or 1,1-bis(4-hydroxyphenyl)-1-phenyl-ethane (bisphenol-AP); 1,1-bis(4-hydroxyphenyl)-3,3,5-trimethylcyclohexane (bisphenol TMC); 1,1-bis(4-hydroxy-3-methylphenyl)cyclohexane (DMBPC); and 2,2-bis(4-hydroxy-3,5-dibromophenyl) propane (tetrabromobisphenol-A).

Branched polycarbonates are also useful, and may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

"Polycarbonate" and "polycarbonate polymer" as used herein further includes copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6):

(6)

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. In other embodiments, dicarboxylic acids that contain a C4-C36 alkylene radical may be used to form copolymers of formula (6). Examples of such alkylene radicals include adipic acid, sebacic acid, or dodecanoic acid.

In one embodiment, D is a $C_{2-6}$ alkylene radical. In another embodiment, D is derived from an aromatic dihydroxy compound of formula (7):

(7)

wherein each $R^k$ is independently a $C_{1-10}$ hydrocarbon group, and n is 0 to 4. The halogen is usually bromine. Examples of compounds that may be represented by the formula (7) include resorcinol, substituted resorcinol compounds; catechol; hydroquinone; substituted hydroquinones; or combinations thereof.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures thereof. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof.

In other embodiments, poly(alkylene terephthalates) may be used. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations thereof.

Copolymers comprising alkylene terephthalate repeating ester units with other ester groups may also be useful. Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate). Poly(cycloalkylene diester)s may also include poly(alkylene cyclohexanedicarboxylate)s. A specific example is poly(1,4-cyclohexanedimethanol-1,4-cyclohexanedicarboxylate) (PCCD), having recurring units of formula (8):

(8)

wherein, as described using formula (6), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination thereof.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

(9)

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer.

The value of D in formula (9) may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of formula (10):

(10)

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used. Specific examples of suitable dihydroxyarlyene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, and combinations thereof.

Such units may be derived from the corresponding dihydroxy compound of the following formula (11):

(11)

wherein Ar and D are as described above. Such compounds are further described in U.S. Pat. No. 4,746,701.

In another embodiment the polydiorganosiloxane blocks comprise repeating structural units of formula (12):

(12)

wherein R and D are as defined above. $R^2$ in formula (12) is a divalent $C_2$-$C_8$ aliphatic group. Each M in formula (12) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group, an alkoxy group, or an aryl group; $R^2$ is a dimethylene, trimethylene or tetramethylene group; and R is a $C_{1-8}$ alkyl, haloalkyl, cyanoalkyl, or aryl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

(13)

wherein R, D, M, $R^2$, and n are as described above.

Such dihydroxy polysiloxanes can be made by effecting a platinum catalyzed addition between a siloxane hydride of the formula (14),

(14)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

Suitable polycarbonates can be manufactured by interfacial polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that may be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or a $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture, including about 0.5 to about 2 wt %.

Initially, the polycarbonate compositions of the present disclosure contain (i) a first polycarbonate polymer having ester side groups. In particular, this first polycarbonate polymer has repeating units derived from a monomer having the structure of Formula (A) or Formula (B):

Formula (A)

Formula (B)

wherein R and R' are $C_2$-$C_{15}$ alkyl; m, n, p, and q are each 0 or 1, m+n=1, and p+q=1; and E is $C_1$-$C_{15}$ alkyl. In more specific embodiments, the monomer of Formula (A) is ethyl 3,5-dihydroxybenzoate (EDHB). In more desirable embodiments, R and R' are branched alkyl. In more specific embodiments, the monomer of Formula (B) is ethyl diphenolate (EDP) or isopropyl diphenolate (IPDP). These monomers can be prepared according to U.S. Pat. Nos. 4,999,408 and 4,960,863, which are fully incorporated by reference herein.

Usually, the first polycarbonate polymer contains the monomer of Formula (A) or Formula (B), and at least one other monomer, i.e. the first polycarbonate polymer is a copolymer. In some embodiments, the second monomer in the first polycarbonate polymer is bisphenol-A. The copolymer may contain from about 0.25 mole % to about 25 mole % of repeating units derived from the monomer of Formula (A) or Formula (B), including from about 0.5 mole % to about 15 mole %. If the copolymer is a dipolymer (i.e. only two monomers), then the second monomer would be present in the amount of about 75 mole % to about 99.75 mole %, including from about 85 mole % to about 99.5 mole % of the dipolymer. The first polycarbonate polymer has a weight-average molecular weight of from about 10,000 to about 50,000 daltons, including from about 18,000 to about 35,000 daltons. Unless specified to the contrary, as used herein, the molecular weight is the weight-average molecular weight determined by gel permeation chromatography (GPC) using bisphenol-A polycarbonate standards. The first polycarbonate polymer is usually present in the composition in an amount such that the total composition contains about 0.25 mole % to about 10 mole %, including about 0.5 mole % to about 5 mole % of repeating units derived from the monomer of Formula (A) or Formula (B).

If desired, the first polycarbonate polymer can be branched. This is accomplished by including a branching agent, as described above, during the reaction that forms the first polycarbonate polymer containing the ester side group. The branching agent can make up from about 0.01 mole % to about 0.5 mole % of the repeating units in the first polycarbonate polymer. The polycarbonate polymer can also be blended with branched polymers.

The polycarbonate composition also includes (ii) a flame retardant additive. The flame retardant additive may be selected from flame retardant salts such as alkali metal salts of perfluorinated $C_1$-$C_{16}$ alkyl sulfonates such as potassium perfluorobutane sulfonate (KPFBS), potassium perfluorooctane sulfonate, tetraethylammonium perfluorohexane sulfonate, potassium diphenylsulfone sulfonate (KSS), and the like, sodium benzene sulfonate, sodium toluene sulfonate (NaTS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like.

Alternatively, the flame retardant additive could be a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

A cyclic siloxane, which also acts as a flame retardant, can also be used. Cyclic siloxanes have the general formula $[(R)_2SiO]_y$, wherein R is a monovalent hydrocarbon or fluorinated hydrocarbon having from 1 to 18 carbon atoms and y is a number from 3 to 12. A useful cyclic siloxane is octaphenylcyclotetrasiloxane.

KPFBS and KSS are particularly useful in the compositions disclosed herein, as are cyclic siloxanes. Combinations of flame retardant additives are also contemplated. The flame retardant additive(s) may be present in the amount of about 0.05 wt % to about 0.5 wt % of the polycarbonate composition.

In additional embodiments, as desired, the compositions can further comprise (iii) a second polycarbonate polymer; and (iv) a third polycarbonate polymer. As seen in the examples further herein, these additional polycarbonate polymers can be any combination of the following: (a) a bisphenol-A homopolymer; (b) another polycarbonate polymer containing the monomer of Formula (A) or Formula (B); or (c) a copolymer having repeating units derived from bisphenol-A and from tetrabromobisphenol-A. In some embodiments, the weight ratio of the first polycarbonate polymer to the second polycarbonate polymer is from about 15:85 to about 99:1.

When a bisphenol-A homopolymer is used as the second polycarbonate polymer, the bisphenol-A homopolymer can have a weight-average molecular weight of from about 20,000 to about 40,000 daltons.

When another polycarbonate polymer containing the monomer of Formula (A) or Formula (B) is used as a second polycarbonate polymer, the description of the first polycarbonate polymer applies, except that the first polycarbonate polymer will have a higher weight-average molecular weight than the second polycarbonate polymer. The difference in weight-average molecular weight is usually at least 2,000 daltons.

When a copolymer having repeating units derived from bisphenol-A (BPA) and from tetrabromobisphenol-A (TBBPA) is used as a second polycarbonate polymer, the tetrabromobisphenol-A is present in an amount such that the copolymer contains from about 15 wt % to about 30 wt % of bromine (determined by molecular weight). This particular copolymer containing TBBPA has inherent flame retardant properties due to the presence of the bromine.

In particular embodiments, it is contemplated that the polycarbonate composition contains (iii) a second polycarbonate polymer which is a bisphenol-A homopolymer; and (iv) a third polycarbonate polymer which is a copolymer containing repeating units derived from bisphenol-A and from tetrabromobisphenol-A. The polycarbonate composition may contain from about 20 parts to about 80 parts by weight of the first polycarbonate polymer; from about 10 parts to about 60 parts by weight of the second polycarbonate polymer; and from about 1 part to about 2 parts by weight of the third polycarbonate polymer.

The polycarbonate compositions of the present disclosure have good flame retardance. In this regard, articles molded from the polycarbonate compositions can attain UL94 V0 performance at thicknesses of 2.0 mm or 1.5 mm. The compositions can also have a melt volume rate (MVR) of about 3 $cm^3$/10 min to about 25 $cm^3$/10 min, when measured according to ASTM D1238-10, 6 minute dwell.

Without being bound by theory, it is believed that the ester side groups promote resin cross-linking. At sufficiently high temperatures, a beta elimination reaction of the ester occurs, forming a transient carboxylic acid side group. Then, in a rapid second step, that carboxylic side group is inserted into another polycarbonate resin chain to form a branch site. The other polycarbonate resin is scissioned. This crosslinking can prevent dripping.

The thermoplastic compositions may be manufactured by methods generally available in the art. For example, the components can be blended in a high speed mixer or other suitable mixer/blender. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

The polycarbonate compositions of the present disclosure may be pelletized, then molded into parts. The compositions may be molded, foamed, or extruded into various structures or articles by known methods, such as injection molding, overmolding, extrusion, rotational molding, blow molding and thermoforming.

The compositions may be formed into articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, electronic device casings and signs and the like. In addition, the polycarbonate compositions may be used for such applications as automotive panel and trim. Examples of suitable articles are exemplified by but are not limited to aircraft, automotive, truck, military vehicle (including automotive, aircraft, and water-borne vehicles), scooter, and motorcycle exterior and interior components, including panels, quarter panels, rocker panels, trim, fenders, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings; personal water-craft; jet-skis; pools; spas; hot tubs; steps; step coverings; building and construction applications such as glazing, roofs, windows, floors, decorative window furnishings or treatments; treated glass covers for pictures, paintings, posters, and like display items; wall panels, and doors; counter tops; protected graphics; outdoor and indoor signs; enclosures, housings, panels, and parts for automatic teller machines (ATM); computer; desk-top computer; portable computer; lap-top computer; hand held computer housings; monitor; printer; keyboards; FAX machine; copier; telephone; phone bezels; mobile phone; radio sender; radio receiver; enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; shoe laces; articles made from plastic-wood combinations; golf course markers; utility pit covers; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated painted articles; coated dyed articles; coated fluorescent articles; coated foam articles; and like applications.

The present disclosure further contemplates additional fabrication operations on said articles, such as, but not limited to, molding, in-mold decoration, baking in a paint oven, lamination, and/or thermoforming. The polycarbonate compositions are especially useful for making articles that have parts with a wall thickness of 2.0 mm or less, or 1.5 mm or less. It is recognized that molded parts can have walls that vary in thickness, and these values refer to the thinnest parts of those walls, or the "thinnest thickness". Put another way, the article has at least one wall that is 2.0 mm/1.5 mm or less in thickness.

The following examples are provided to illustrate the polycarbonate compositions, articles, and methods of the present disclosure. The examples are merely illustrative and are not intended to limit the disclosure to the materials, conditions, or process parameters set forth therein.

EXAMPLES

Table 1 below broadly describes the resin designations and descriptions used in the Examples, as well as the other ingredients used. EDHB refers to ethyl-3,5-dihydroxybenzoate. IPDP refers to isopropyl diphenolate. EDP refers to ethyl diphenolate.

TABLE 1

| Name | Description | Mole % BPA | Mole % ester | Mole % THPE | MW |
|---|---|---|---|---|---|
| PC-1 | BPA homopolymer, higher MW | 100 | 0.0 | 0.00 | 30,000 |
| PC-2 | BPA homopolymer, lower MW | 100 | 0.0 | 0.00 | 22,000 |
| PC-3 | BPA/TBBPA copolymer, 26 wt % bromine | 71 | 0.0 | 0.00 | 23,600 |
| PC-4 | 5/95 mole % EDHB-BPA copolymer, higher MW | 95 | 5.0 | 0.00 | 24,600 |
| PC-5 | 5/95 mole % EDHB-BPA copolymer, lower MW | 95 | 5.0 | 0.00 | 22,500 |
| PC-6 | 5/95 mole % EDHB-BPA copolymer, branched, higher MW | 95 | 5.0 | 0.35 | 28,400 |
| PC-7 | 5/95 mole % EDHB-BPA copolymer, branched, lower MW | 95 | 5.0 | 0.35 | 25,200 |
| PC-8 | 0.5/99.5 mole % IPDP-BPA copolymer, branched | 99.5 | 0.5 | 0.35 | 25,400 |
| PC-9 | 1/99 mole % IPDP-BPA copolymer, branched | 99 | 1.0 | 0.35 | 25,100 |
| PC-10 | 25/75 mole % EDP-BPA copolymer, lower Mw | 25 | 75 | 0.00 | 24,450 |
| PC-11 | 10/90 mole % EDP-BPA copolymer | 10 | 90 | 0.00 | 25,000 |
| PC-12 | 25/75 mole % EDP-BPA copolymer, higher Mw | 25 | 75 | 0.00 | 35,000 |
| PC-13 | 35/65 mole % EDP-BPA copolymer | 35 | 65 | 0.00 | 34,250 |
| PC-14 | 10/90 mole % EDHB-BPA copolymer | 90 | 10 | 0 | 25,151 |
| PC-15 | Bisphenol-AP homopolymer | 0 | 0 | 0 | 21,925 |
| KSS | Potassium Diphenylsulfone sulfonate | — | — | — |
| KPFBS | Potassium Perfluorobutane sulfonate | — | — | — |
| NaTS | Sodium toluene sulfonate | | | |
| Siloxane | Octaphenylcyclotetrasiloxane | — | — | — |

Example 1

5 Mole % EDHB-BPA Copolymer (PC-4)

Materials and Methods

A solution of p-cumylphenol (157 grams, 0.74 moles, 3.6 mole %) was prepared in 500 mL of dichloromethane. The p-cumylphenol (PCP) solution was placed in an addition pot connected to the reactor via a dosing pump.

To the formulation tank was added dichloromethane (15 L), DI water (8 L), 3,5-EDHB (190 grams, 1.0 mole, 5.1 mole %), bisphenol-A (4310 grams, 18.9 moles), triethylamine (36 grams, 0.35 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (8 L) which was transferred to the batch reactor. The reactor agitator was started and the circulation flow was set at 80 L/min. Phosgene vapor flow to the reactor was initiated (80 g/min flow rate) by the DCS and an initial amount (250 grams, 2.5 moles) was added. The pH of the reaction was maintained at a target of 10.0 by DCS-controlled addition of 33% aqueous NaOH.

After addition of the initial amount of phosgene, the PCP solution was added to the reactor at 250 mL/min flow rate by DCS control while phosgene flow to the reactor continued. Phosgene addition continued until the total set point was reached (2500 grams, 25.3 moles). After completion of the phosgene addition, a sample of the reactor was obtained and verified to be free of un-reacted BPA and free of chloroformate. Mw of a reaction sample was determined by GPC using a UV detector (Mw=24937, PDI=2.9). An additional charge of phosgene was added (200 grams, 2.0 mole) to the reactor. The reactor was purged with nitrogen then the batch was transferred to the centrifuge feed tank.

To the batch in the centrifuge feed tank was added dilution dichloromethane (8 L) then the mixture was purified using a train of liquid—liquid centrifuges. Centrifuge one separated the brine phase. Centrifuge two removed the triethylamine catalyst by extracting the resin solution with aqueous hydrochloric acid (pH 1). Centrifuges three through eight removed residual ions by extracting the resin solution with DI water. A sample of the resin solution was tested and verified less than 5 ppm each of ionic chloride and residual triethylamine.

The resin solution was transferred to the precipitation feed tank. The resin was isolated as a white powder by steam precipitation followed by drying in a cone shaped vessel using heated nitrogen (210 F). Powder yield 3289 grams. Mw=24767 PDI=2.7.

Example 2

5 Mole % EDHB-BPA Copolymer (PC-5)

The same materials, methods, and procedures were applied as in Example 1, however, the solution prepared consisted of 500 mL dichloromethane and 174 grams p-cumylphenol (0.82 moles, 4.0 mole %).

Example 3

5 Mole % Branched EDHB-BPA Copolymer (PC-6)

The same materials, methods, and procedures were applied as in Example 1, however, the solution prepared consisted of 500 mL dichloromethane, 166 grams p-cumylphenol (0.78 moles, 3.8 mole %), and 21.8 grams trishydroxyphenylethane (THPE) branching agent (0.072 moles, 0.35 mole %).

Example 4

5 Mole % Branched EDHB-BPA Copolymer (PC-7)

The same materials, methods, and procedures were applied as in Example 1, however, the solution prepared consisted of 500 mL dichloromethane, 188 grams p-cumylphenol (0.88 moles, 4.3 mole %), and 21.8 grams THPE branching agent (0.072 moles, 0.35 mole %).

Testing of Composite Blend: Extrusion and Molding, MVR Testing

All formulations were prepared by dry blending and extruded with a Werner Pfeidlere 30 mm twin screw at a temperature profile of 520° F. to 550° F., cutting into pellets, and injection molding at 540° F. to 580° F. All amounts are given in parts by weight (pbw) based on the total weight of polycarbonate. Melt volume flow rate test (MVR) was conducted using ASTM D1238-10 at 1.2 kg and 300° F.

Gel permeation chromatography analysis was carried out on a Waters Associates Model 2695 instrument fitted with two Water's linear Ultra-styragel (Mixed Bed) GPC columns using dichloromethane as the mobile phase with toluene as the reference peak. The instrument was calibrated using polystyrene narrow standards, then queued using bisphenol-A polycarbonate resin standards. A UV detector was used to determine the sample Mw.

Flame Testing

Flammability tests are typically performed according to Underwriter's Laboratory Bulletin 94. Materials may be classified as V-0, V-1 or V-2 on the basis of the test results obtained for samples of a given thickness. It is assumed that a material that meets a given standard at a given thickness can also meet the same standard at greater thicknesses (e.g. a material that obtains V0 performance at 0.8 mm thickness can also obtain V0 performance at 1.0 mm thickness, 1.5 mm, etc.). Generally, samples are burned in a vertical orientation after aging for 48 hours at 23° C. At least 10 injection molded bars are burned for each UL test. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bars flame out time (FOT) is the sum of the flame out time for five bars each lit twice for ten (10) seconds each, for a maximum flame out time of 50 seconds. FOT1 is the average flame out time after the first light. FOT2 is the average flame out time after the second light.

V-1, V-2: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton. The V2 standard is the same as V-1, except that flaming drips that ignite the cotton are permitted. Five bar flame out time (FOT) is the sum of the flame out time for five bars, each lit twice for ten (10) seconds each, for a maximum flame out time of 250 seconds.

Data was collected from many samples (typically 20 bars), then analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$\text{PFTP} = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula: $P_{t1>mbt,\ n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,\ n=0} = (1-P_{t2>mbt})^5$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,\ n=0}$ that no specimen exhibits dripping during the flame test is an attribute function, estimated by: $(1-P_{drip})^5$ where $P_{drip}$=(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

A 90% probability of passing the first time (i.e., p(FTP) of 0.9) is considered acceptable performance. Values much significantly lower than 0.9 are considered unacceptable.

Results

In all of the Tables below, testing was performed for a range of twall thicknesses. The results are reported for the thinnest wall thickness at which passing performance was observed. Thickness where all tests failed are not included.

Results of UL 94 p(FTP) testing of the ester side group resins are given in Tables 2-5. The three copolymer formulations which were blended with polycarbonate homopolymer as needed to achieve 2 mole %, 3.5 mole %, and 5 mole % ester content. Two controls were run with different ratios of PC homopolymer to determine the effect of MVR on the flame results independent of ester content. Controls are labeled "C" in the tables below, and the Examples are labeled with the letter "E".

Flammability and MVR testing was conducted on compositions using the EDHB-BPA copolymers (non-branched) with KSS and the BPA/TBBPA copolymer as flame retardant additives. The results are shown in Table 2.

Flammability and MVR testing was also conducted on compositions using the EDHB-BPA copolymers (non-branched) with KPFBS and cyclic siloxane as flame retardant additives. The results are shown in Table 3.

As shown in Tables 2 and 3, the ester containing samples performed much better than the controls. Further, no polymer samples containing KSS salt and bromine additives in addition to ester side groups had dripping. Polymer samples containing KPFBS and cyclic siloxane additives also showed significantly less dripping. The controls exhibited significantly more burning drips, and the low p(FTP) results for the controls are primarily the result of this additional dripping. At thicknesses of 2 mm and MVR of 13 cm$^3$/10 min, the Example samples achieved robust UL V0 performance.

TABLE 2

| Ingredient | Units | C1 | E1 | E2 | E3 | E4 | E5 | C2 |
|---|---|---|---|---|---|---|---|---|
| PC-1 | pbw | 40 | 24 | 12 | 0 | 12 | 0 | 28 |
| PC-2 | pbw | 60 | 36 | 18 | 0 | 48 | 30 | 72 |
| PC-4 | pbw | 0 | 40 | 70 | 100 | 40 | 70 | 0 |
| KSS | pbw | 0.30 | 0.30 | 0.30 | 0.30 | 0.30 | 0.30 | 0.30 |
| PC-3 | pbw | 1.25 | 1.25 | 1.25 | 1.25 | 1.25 | 1.25 | 1.25 |
| mole % ester | | 0 | 2 | 3.5 | 5 | 2 | 3.5 | 0 |
| MVR, 6 min. dwell | cm$^3$/10 min | 13 | 13.6 | 13.4 | 13.8 | 16.4 | 16.1 | 16.3 |
| MVR, 18 min. dwell | cm$^3$/10 min | 13.2 | 13.8 | 13.4 | 12.7 | 17.1 | 16.6 | 15.6 |
| V0, 2.0 mm p(FTP) | | Fail | 0.9965 | 0.9986 | 0.9721 | 0.9958 | 0.9887 | Fail |
| Burning drips | | 8 | 0 | 0 | 0 | 0 | 0 | 14 |
| Non-burning drips | | 10 | 3 | 0 | 1 | 10 | 9 | 5 |

TABLE 3

| Ingredient | Units | C3 | E6 | E7 | E8 | E9 | E10 | C4 |
|---|---|---|---|---|---|---|---|---|
| PC-1 | pbw | 40 | 24 | 12 | 0 | 12 | 0 | 28 |
| PC-2 | pbw | 60 | 36 | 18 | 0 | 48 | 30 | 72 |
| PC-4 | pbw | 0 | 40 | 70 | 100 | 40 | 70 | 0 |
| KPFBS | pbw | 0.08 | 0.08 | 0.08 | 0.08 | 0.08 | 0.08 | 0.08 |
| Siloxane | pbw | 0.10 | 0.10 | 0.10 | 0.10 | 0.10 | 0.10 | 0.10 |
| mole % ester | | 0 | 2 | 3.5 | 5 | 2 | 3.5 | 0 |
| MVR, 6 min. dwell | cm$^3$/10 min | 15.7 | 15.2 | 14.1 | 14.3 | 18.9 | 17.7 | 19.5 |
| MVR, 18 min. dwell | cm$^3$/10 min | 16.6 | 14.4 | 13.3 | 12.5 | 16.8 | 16 | 20.1 |
| V0, 2.0 mm | | Fail | 0.7533 | 0.9916 | 0.5620 | Fail | 0.9920 | Fail |
| Burning drips | | 12 | 0 | 0 | 2 | 6 | 0 | 14 |
| Non-burning drips | | 5 | 3 | 0 | 0 | 1 | 0 | 2 |

In Table 4, blends of high Mw and low Mw EDHB-BPA were tested with the various flame retardant additives to try and increase the MVR. The Examples using KSS and BPA/TBBPA copolymer generally performed better than those using KPFBS and cyclic siloxane.

TABLE 4

| Ingredient | Units | C5 | E11 | E12 | E13 | C6 | E14 | E15 | E16 |
|---|---|---|---|---|---|---|---|---|---|
| PC-1 | pbw | 40 | | | | 40 | | | |
| PC-2 | pbw | 60 | | | | 60 | | | |
| PC-4 | pbw | 0 | 60 | 40 | 20 | 0 | 60 | 40 | 20 |

TABLE 4-continued

| Ingredient | Units | C5 | E11 | E12 | E13 | C6 | E14 | E15 | E16 |
|---|---|---|---|---|---|---|---|---|---|
| PC-5 | pbw | | 40 | 60 | 80 | | 40 | 60 | 80 |
| KPFBS | pbw | 0.08 | 0.08 | 0.08 | 0.08 | | | | |
| Siloxane | pbw | 0.10 | 0.10 | 0.10 | 0.10 | | | | |
| KSS | pbw | | | | | 0.30 | 0.30 | 0.30 | 0.30 |
| PC-3 | pbw | | | | | 1.25 | 1.25 | 1.25 | 1.25 |
| mole % ester | | 0 | 5 | 5 | 5 | 0 | 5 | 5 | 5 |
| MVR, 6 min. dwell | cm³/10 min | 17.3 | 16.7 | 18 | 17.7 | 13 | 15.9 | 17.2 | 19.4 |
| MVR, 18 min. dwell | cm³/10 min | 17 | 16.3 | 17.5 | 17.9 | 13.3 | 16.9 | 18.5 | 19.5 |
| V0, 2.0 mm p(FTP) | | Fail | 0.9863 | Fail | 0.5992 | Fail | 0.9783 | 0.9969 | 0.7582 |
| Burning drips | | 9 | 0 | 5 | 1 | 12 | 0 | 0 | 1 |
| Non-burning drips | | 3 | 0 | 2 | 0 | 3 | 4 | 0 | 5 |

In Tables 5A and 5B, branched EDHB-BPA copolymers were tested. The results were improved over those of Tables 2-4, in that the samples passed the V0 test at 1.8 mm thickness. At a narrower thickness of 1.5 mm, the Examples containing only 3.5 mole % ester content failed, and failed once at 5 mole % ester content. When the blend contained the higher-Mw branched copolymer (E24-26), no failures occurred.

TABLE 5A

| Ingredient | Units | C7 | E17 | E18 | E19 | E20 |
|---|---|---|---|---|---|---|
| PC-1 | pbw | 40 | 12 | | 12 | |
| PC-2 | pbw | 60 | 18 | | 18 | 30 |
| PC-3 | pbw | | 1.25 | 1.25 | 1.25 | 1.25 |
| PC-4 | pbw | | 70 | 100 | | |
| PC-5 | pbw | | | | | |
| PC-7 | pbw | | | | 70 | 70 |
| PC-6 | pbw | | | | | |
| KSS | pbw | 0.3 | 0.3 | 0.3 | 0.3 | 0.3 |
| mole % ester | | 0 | 3.5 | 5 | 3.5 | 3.5 |
| mole % branching | | 0 | 0 | 0 | 0.245 | 0.245 |
| MVR, 6 min. dwell | cm³/10 min | 12.8 | 13.4 | 13.9 | 12.2 | 14.5 |
| MVR, 18 min. dwell | cm³/10 min | 12.96 | 13.54 | 13.99 | 12.16 | 15.81 |
| V0, 1.8 mm p(FTP) | | Fail | Fail | Fail | 1.0000 | 0.9997 |
| Burning drips | | 8 | 11 | 6 | 0 | 3 |
| Non-burning drips | | 6 | 4 | 4 | 0 | 0 |
| V0, 1.5 mm p(FTP) | | — | — | — | Fail | Fail |
| Burning drips | | | | | 3 | 3 |
| Non-burning drips | | | | | 6 | 10 |

Testing Stability of Resin

To assess the stability of resin under abusive molding conditions, samples of resins containing no flame retardant additives were pelletized and molded with both standard and extended residence times (dwell times) at 620° F. The resins contained either ethyl dihydroxybenzoate (EDHB) or isopropyl diphenolate (IPDP), in varying amounts. Stability was determined primarily by weight-average molecular weight measurement on the molded parts.

Figure 1:
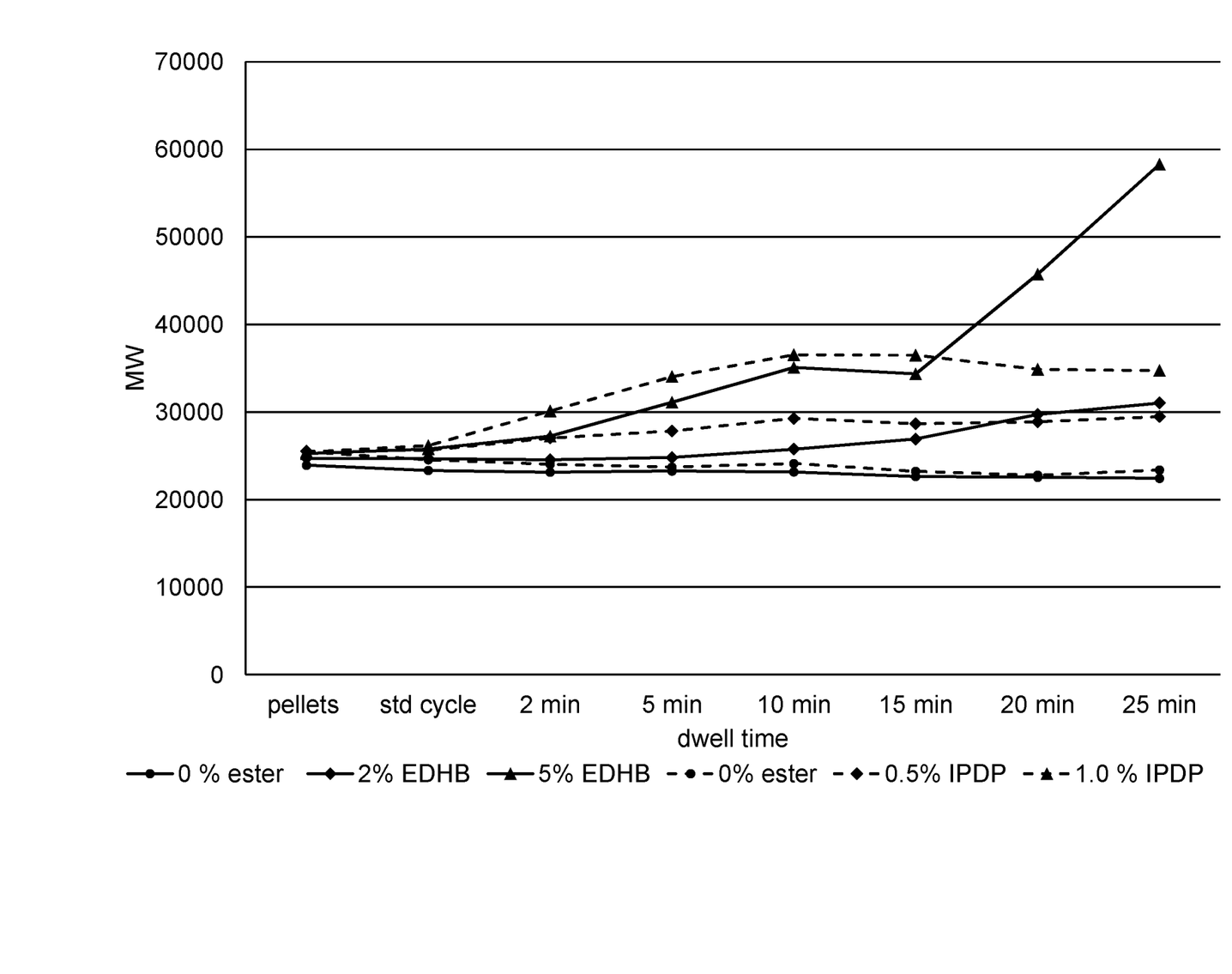
FIG. 1 is a graph showing the build in weight-average molecular weight versus the ester content of ethyl-3,5-dihydroxybenzoate (EDHB) copolymers and isopropyl diphenolate (IPDP) copolymers at 620° F. part molding with extended dwell times. Circle indicates 0% ester, diamond indicates 2 mole % ester, and triangle indicates 5 mole % ester in the copolymer; solid line indicates EDHB, and dotted line indicates IPDP in the copolymer.

As shown in FIG. 1 and Table 6 below, weight-average molecular weight did increase over time, but only with extreme unrealistic dwell times. Normal cycle times and short dwell samples showed negligible weight-average molecular weight build. The parts from the extended dwell molding exhibited extensive splay due to the gas evolved in the reaction but no crosslinking. All parts, even the very high weight-average molecular weight parts, were able to be ejected from the molding machine without difficulty. A notable observation is that the sample with 5% EDHB continued to build in molecular weight throughout the experiment until it was terminated at 25 minutes, while the 1% IPDP sample built in molecular weight up to 15 minutes as rapidly as the 5% EDHB, but then remained stable after 15 minutes.

TABLE 5B

| Ingredient | Units | C7 | E21 | E22 | E23 | E24 | E25 | E26 |
|---|---|---|---|---|---|---|---|---|
| PC-1 | pbw | 40 | | | | 12 | | |
| PC-2 | pbw | 60 | | | | 18 | 30 | |
| PC-3 | pbw | | 1.25 | 1.25 | 1.25 | 1.25 | 1.25 | 1.25 |
| PC-4 | pbw | | | 50 | 25 | | | |
| PC-5 | pbw | | | | 25 | | | |
| PC-7 | pbw | | 100 | 50 | 50 | | | |
| PC-6 | pbw | | | | | 70 | 70 | 100 |
| KSS | pbw | 0.3 | 0.3 | 0.3 | 0.3 | 0.3 | 0.3 | 0.3 |
| mole % ester | | 0 | 5 | 5 | 5 | 3.5 | 3.5 | 5 |
| mole % branching | | 0 | 0.350 | 0.175 | 0.175 | 0.245 | 0.245 | 0.350 |
| MVR, 6 min. dwell | cm³/10 min | 12.8 | 11.7 | 12.9 | 13.5 | 8.04 | 9.2 | 6.26 |
| MVR, 18 min. dwell | cm³/10 min | 12.96 | 12.83 | 12.57 | 14.45 | 8.69 | 9.34 | 6.5 |
| V0, 1.8 mm p(FTP) | | Fail | 1.0000 | 0.9979 | 0.9958 | 1.0000 | 1.0000 | 0.9985 |
| Burning drips | | 8 | 0 | 0 | 2 | 0 | 0 | 0 |
| Non-burning drips | | 6 | 0 | 0 | 0 | 0 | 0 | 0 |
| V0, 1.5 mm p(FTP) | | — | 0.7496 | 0.9209 | Fail | 1.0000 | 0.9830 | 0.9944 |
| Burning drips | | | 1 | 0 | 5 | 0 | 0 | 0 |
| Non-burning drips | | | 4 | 8 | 7 | 0 | 0 | 0 |

TABLE 6

|  | Pellets | Std. cycle | 2 min | 5 min | 10 min | 15 min | 20 min | 25 min |
|---|---|---|---|---|---|---|---|---|
| 0 mole % ester | 23932 | 23327 | 23133 | 23266 | 23166 | 22648 | 22563 | 22432 |
| 2 mole % EDHB | 24730 | 24677 | 24558 | 24822 | 25755 | 26924 | 29723 | 31035 |
| 5 mole % EDHB | 25254 | 25789 | 27249 | 31116 | 35087 | 34358 | 45741 | 58290 |
| 0 mole % ester | 25459 | 24561 | 24043 | 23710 | 24135 | 23240 | 22797 | 23380 |
| 0.5 mol % IPDP | 25540 | 25630 | 27031 | 27833 | 29275 | 28673 | 28892 | 29491 |
| 1.0 mol % IPDP | 25440 | 26162 | 30119 | 34049 | 36540 | 36493 | 34876 | 34731 |

DISCUSSION

As shown above, the addition of flame retardant salts in combination with the ester side groups unexpectedly resulted in robust UL V0 performance at thicknesses of 2.0 mm and MVR of 13, and no drips, indicating potential use at thinner gauges and higher MVR. The flame retardant salts may be added to copolymers containing ester side groups, either branched or unbranched, with similar results.

and procedures were applied as in Example 6, however IPDP (67 grams, 0.20 mole) and 4410 grams BPA (19.3 moles) was used.

Next, compositions were made using the PC-8 and PC-9 IPDP-BPA copolymers with different flame retardants. The results are seen in Table 7.

TABLE 7

| Ingredient | Units | C8 | E27 | E28 | E29 | E30 | E31 | C9 | E32 | E33 | E34 | E35 | E36 |
|---|---|---|---|---|---|---|---|---|---|---|---|---|---|
| PC-1 | pbw | 40 | | | | | | 40 | | | | | |
| PC-2 | pbw | 60 | | | | | | 60 | | | | | |
| PC-4 | pbw | | 100 | | | | | | 100 | | | | |
| PC-7 | pbw | | | 100 | | | | | | 100 | | | |
| PC-8 | pbw | | | | 100 | 50 | | | | | 100 | 50 | |
| PC-9 | pbw | | | | | 50 | 100 | | | | | 50 | 100 |
| KPFBS | pbw | | | | | | | 0.08 | 0.08 | 0.08 | 0.08 | 0.08 | 0.08 |
| Siloxane | pbw | | | | | | | 0.1 | 0.1 | 0.1 | 0.1 | 0.1 | 0.1 |
| KSS | pbw | 0.3 | 0.3 | 0.3 | 0.3 | 0.3 | 0.3 | | | | | | |
| PC-3 | pbw | 1.25 | 1.25 | 1.25 | 1.25 | 1.25 | 1.25 | | | | | | |
| mole % ester | | 0 | 5 | 5 | 0.5 | 0.75 | 1.0 | 0 | 5 | 5 | 0.5 | 0.75 | 1.0 |
| mole % branching | | 0 | 0 | 0.35 | 0.35 | 0.35 | 0.35 | 0 | 0 | 0.35 | 0.35 | 0.35 | 0.35 |
| MVR, 6 min. dwell | cm³/10 min | 14.2 | 13.9 | 11.8 | 9.88 | 9.83 | 10.8 | 15.4 | 13.6 | 11.8 | 9.96 | 10.1 | 10.4 |
| MVR, 18 min dwell | cm³/10 min | 15.6 | 14 | 12.4 | 10.2 | 11.8 | 15.4 | 19.5 | 15.4 | 13.4 | 12.9 | 19.7 | 19.9 |
| 1.8 mm p(FTP), V0 | | Fail | Fail | 1.0 | 0.86 | 0.93 | 0.89 | Fail | Fail | 1.0 | 0.85 | 0.68 | 0.80 |
| Burning drips | | 13 | 3 | 0 | 0 | 0 | 1 | 19 | 10 | 0 | 0 | 0 | 0 |
| non-burning drips | | 5 | 4 | 0 | 0 | 0 | 0 | 1 | 1 | 0 | 0 | 0 | 0 |

Example 5

10 Mole % EDHB-BPA Copolymer

A polycarbonate resin (PC-14) containing 9.9 mole % of 3,5-dihydroxyethyl benzoate (3,5-EDHB) was made. The same materials, methods, and procedures were applied as in Example 1, however, the solution prepared consisted of 375 grams 3,5-EDHB (2.1 mole, 9.9 mole %) and 4125 grams bisphenol-A (18.1 moles). Powder yield 2858 grams. Mw=25151, PDI=2.8.

Example 6

A branched polycarbonate resin (PC-8) containing 0.5 mole % of isopropyl diphenolate (IPDP) was made. The same materials, methods, and procedures were applied as in Example 4, however IPDP (33.5 grams, 0.10 mole) was added in place of EDHB, and 4440 grams BPA (19.5 moles) was used.

Example 7

A branched polycarbonate resin (PC-9) containing 1.0 mole % of IPDP was made. The same materials, methods, Example 8

A copolymer (PC-10) containing 25 mole % ethyl diphenolate (EDP) and bisphenol-A (BPA) was made. The procedure of Example 1 was followed, however, the solution prepared contained dichloromethane (23 L), DI water (10 L), BPA (3075 grams, 13.5 moles), EDP (1425 grams, 4.53 mole) and triethylamine (55 ml, 40 g, 0.395 mole).

Example 9

A 10 mole % EDP-BPA copolymer (PC-11) was made using essentially the same procedure as Example 6, but starting with 157 grams PCP (0.74 mole), 3900 grams BPA (17.1 mole), and 600 grams EDP (1.91 mole).

Example 10

A high molecular weight (HMW) 25 mole % EDP-BPA copolymer (PC-12) was made using essentially the same procedure as Example 6, but starting with 105 grams PCP (0.495 mole).

Example 11

A 35 mole % EDP-BPA copolymer (PC-13) was made using essentially the same procedure as Example 6, but starting with 105 grams PCP (0.495 mole), 2575 grams BPA (11.3 mole), and 1925 grams EDP (6.12 mole).

Table 8 provides some data on representative samples of Examples 6-9.

TABLE 8

|  | PC-10 | PC-11 | PC-12 | PC-13 |
|---|---|---|---|---|
| Target mole % ester | 25 | 10 | 25 | 35 |
| Mole % ester, NMR | 24 | 10 | — | 34.2 |
| Mw | 24448 | 25035 | 35003 | 34251 |
| Mn | 9574 | 9857 | 11736 | 11436 |
| PDI | 2.55 | 2.54 | 2.98 | 3 |
| Tg (° C.) | 132.8 | 142.9 | 135.3 | 129.8 |

Next, compositions were made using the PC-12 EDP-BPA copolymer and different flame retardants. The results are seen in Tables 9A and 9B.

TABLE 9A

| Ingredient | Units | C10 | C11 | C12 | C13 | C14 | E37 | E38 | E39 |
|---|---|---|---|---|---|---|---|---|---|
| PC-1 | pbw | 40 | 40 | 40 | 40 | 40 | 36.8 | 36.8 | 36.8 |
| PC-2 | pbw | 60 | 60 | 60 | 60 | 60 | 55.2 | 55.2 | 55.2 |
| PC-12 | pbw |  |  |  |  |  | 8 | 8 | 8 |
| KSS | pbw | 0.30 | 0.30 |  |  | 0.02 | 0.30 | 0.30 |  |
| KPFBS | pbw |  |  | 0.08 |  |  |  |  | 0.08 |
| NaTS | pbw |  |  |  | 0.1 | 0.013 |  |  |  |
| Siloxane | pbw |  |  | 0.10 |  |  |  |  | 0.10 |
| PC-3 | pbw | 1.25 | 5 |  |  |  | 1.25 | 5 |  |
| mole % ester |  | 0 | 0 | 0 | 0 | 0 | 2 | 2 | 2 |
| MVR, 6 min. dwell | cm³/10 min | 15 | 13.8 | 16.2 | 15.4 | 15.3 | 14.5 | 13.9 | 16 |
| MVR, 18 min. dwell | cm³/10 min | 15.6 | 14.2 | 17.4 | 16.6 | 15.8 | 14 | 14.1 | 16.7 |
| 3.0 mm p(FTP), V0 |  | fail | 0.7527 | 1 | 0.5358 | 0.243 | 0.8923 | 0.699 | 0.8358 |
| Burning drips |  | 6 of 10 | 0 | 0 | 2 of 19 | 2 | 0 | 0 | 0 |
| Non-burning drips |  | 0 | 0 | 0 | 0 | 0 | 0 | 0 | 0 |
| 2.5 mm p(FTP), V0 |  | fail | 0.5219 | 0.9803 | fail | fail | 0.1612 | 0.0159 | 0.4791 |
| Burning drips |  | 5 of 5 | 2 | 0 | 7 of 10 | 5 of 5 | 2 | 3 | 2 |
| Non-burning drips |  |  |  |  |  |  | 4 | 4 |  |

TABLE 9B

| Ingredient | Units | E40 | E41 | E42 | E43 | E44 | E45 | E46 |
|---|---|---|---|---|---|---|---|---|
| PC-1 | pbw | 36.8 | 36.8 | 32 | 32 | 32 | 32 | 32 |
| PC-2 | pbw | 55.20 | 55.20 | 48.00 | 48.00 | 48.00 | 48.00 | 48.00 |
| PC-12 | pbw | 8.00 | 8.00 | 20.00 | 20.00 | 20.00 | 20.00 | 20.00 |
| KSS | pbw |  | 0.02 | 0.30 | 0.30 |  |  | 0.02 |
| KPFBS | pbw |  |  |  |  | 0.08 |  |  |
| NaTS | pbw | 0.1 | 0.013 |  |  |  | 0.1 | 0.013 |
| Siloxane | pbw |  |  |  |  | 0.10 |  |  |
| PC-3 | pbw |  |  | 1.25 | 5.00 |  |  |  |
| mole % ester |  | 2 | 2 | 5 | 5 | 5 | 5 | 5 |
| MVR, 6 min. dwell | cm³/10 min | 15.3 | 14.8 | 13.6 | 13.3 | 15.6 | 14.5 | 14 |
| MVR, 18 min. dwell | cm³/10 min | 16.3 | 14.5 | 13.5 | 13.3 | 15.2 | 15.9 | 14.6 |
| 3.0 mm p(FTP), V0 |  | 0.7769 | fail | 0.9226 | 0.9888 | 0.9731 | 0.5719 | 0.1532 |
| Burning drips |  | 5 | 5 of 5 | 0 | 0 | 0 | 1 | 4 of 19 |
| Non-burning drips |  | 0 | 0 | 0 | 0 | 0 | 0 | 0 |
| 2.5 mm p(FTP), V0 |  | fail | fail | 0.2535 | 0.3149 | 0.8126 | fail | fail |
| Burning drips |  | 5 of 5 | 5 of 5 | 0 | 0 | 0 | 5 of 5 | 5 of 5 |
| Non-burning drips |  |  |  | 3 |  |  |  |  |

The MVR data was as expected. In FR testing, E37 and E42, when compared to C10, had complete suppression of dripping at 3.0 mm, and substantial suppression of dripping at 2.5 mm. It was expected that the EDP-containing resins would be effective with some flame retardants and not with others.

Example 12

Table 10 and Table 11 contain data on blends of EDHB-BPA copolymer with a bisphenol-AP homopolymer. Compared to the controls using bisphenol-A homopolymer, all experimental lots using EDHB-BPA copolymer showed suppression of dripping, with samples containing higher levels of the bisphenol-AP resin showing V0 capabaility of 0.73 to 0.99 at 1.5 mm thickness.

TABLE 10

| Ingredient | Units | C15 | C16 | C17 | E47 | E48 | E49 |
|---|---|---|---|---|---|---|---|
| PC-2 | pbw | 50 | 60 | 70 |  |  |  |
| PC-5 | pbw |  |  |  | 50 | 60 | 70 |
| PC-15 | pbw | 50 | 40 | 30 | 50 | 40 | 30 |
| KPFBS | pbw | 0.08 | 0.08 | 0.08 | 0.08 | 0.08 | 0.08 |

TABLE 10-continued

| Ingredient | Units | C15 | C16 | C17 | E47 | E48 | E49 |
|---|---|---|---|---|---|---|---|
| Siloxane | pbw | 0.10 | 0.10 | 0.10 | 0.10 | 0.10 | 0.10 |
| mole % ester |  | 0 | 0 | 0 | 2.5 | 3 | 3.5 |
| wt % Bis AP |  | 50 | 40 | 30 | 50 | 40 | 30 |

TABLE 10-continued

| Ingredient | Units | C15 | C16 | C17 | E47 | E48 | E49 |
|---|---|---|---|---|---|---|---|
| MVR, 6 min dwell | cm³/10 min | 10.9 | 14.2 | 16.8 | 10.1 | 12.3 | 14.3 |
| MVR, 18 min dwell | cm³/10 min | 11.45 | 14.72 | 17.87 | 10.32 | 12.93 | 14.42 |
| V0, 1.5 mm | p(FTP) | fail | fail | fail | 0.737 | fail | fail |
| Burning Drips | | 8 | 14 | 19 | 1 | 8 | 7 |
| Non-burning drips | | 2 | 3 | 1 | 0 | 5 | 6 |

TABLE 11

| Ingredient | Unit | C18 | C19 | C20 | E50 | E51 | E52 | E53 | E54 | E55 |
|---|---|---|---|---|---|---|---|---|---|---|
| PC-2 | pbw | 50 | 40 | 30 | | | | | | |
| PC-15 | pbw | 50 | 60 | 70 | 50 | 60 | 70 | 50 | 60 | 70 |
| PC-5 | pbw | | | | 50 | 40 | 30 | | | |
| PC-14 | pbw | | | | | | | 50 | 40 | 30 |
| KPFBS | pbw | 0.08 | 0.08 | 0.08 | 0.08 | 0.08 | 0.08 | 0.08 | 0.08 | 0.08 |
| Siloxane | pbw | 0.1 | 0.1 | 0.1 | 0.1 | 0.1 | 0.1 | 0.1 | 0.1 | 0.1 |
| mole % ester | | 0 | 0 | 0 | 2.5 | 2 | 1.5 | 5 | 4 | 3 |
| MVR, 6 min dwell | cm³/10 min | 10.9 | 8.43 | 7.34 | 9.76 | 8.28 | 7.14 | 8.99 | 8.04 | 6.79 |
| MVR, 18 min dwell | cm³/10 min | 11.1 | 9.11 | 7.41 | 9.87 | 8.54 | 6.7 | 9.1 | 7.85 | 6.82 |
| V0, 1.5 mm p(FTP) | | fail | fail | fail | 0.826 | 0.698 | 0.861 | 0.892 | 0.983 | 0.999 |
| burning drips | | 14 | 2 | 9 | 0 | 1 | 0 | 0 | 0 | 0 |
| Non-burning drips | | 4 | 11 | 4 | 0 | 0 | 0 | 0 | 0 | 0 |
| V0, 1.2 mm p(FTP) | | | fail | | fail | fail | fail | fail | fail | 0.351 |
| burning drips | | | 16 | | 12 | 5 | 4 | 11 | 5 | 2 |
| Non-burning drips | | | 2 | | 4 | 1 | 3 | 2 | 1 | 1 |

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A flame retardant composition, comprising:
a first polycarbonate polymer having repeating units derived from a monomer having the structure of Formula (A) or Formula (B):

wherein
R and R' are $C_2$-$C_{15}$ alkyl;
m, n, p, and q are each 0 or 1, m+n=1, and p+q=1; and
E is $C_1$-$C_{15}$ alkyl; and
about 0.05 to about 0.5 wt. % of a flame retardant additive, wherein the flame retardant additive is an alkali metal salt of a perfluorinated C1-C16 alkyl sulfonate, potassium diphenylfone sulfonate, sodium benzene sulfonate, sodium toluene sulfonate, or a cyclic siloxane having the formula $[(R'')_2SiO]_y$ wherein R'' wherein R is a monovalent hydrocarbon or fluorinated hydrocarbon having from 1 to 18 carbon atoms and y is a number from 3 to 12,
wherein the first polycarbonate is un-crosslinked.

2. The flame retardant composition of claim 1, wherein the first polycarbonate polymer is a copolymer.

3. The flame retardant composition of claim 2, wherein the monomer is isopropyl diphenolate or ethyl-3,5-dihydroxybenzoate.

4. The flame retardant composition of claim 2, wherein the first polycarbonate polymer further comprises repeating units derived from bisphenol-A or from a branching agent.

5. The flame retardant composition of claim 2, wherein the first polycarbonate polymer contains from about 0.25 mole % to about 25 mole % of the repeating units derived from the monomer of Formula (A) or Formula (B).

6. The flame retardant composition of claim 1, wherein the first polycarbonate polymer has a weight-average molecular weight of from about 10,000 to about 50,000.

7. The flame retardant composition of claim 1, further comprising a second polycarbonate polymer.

8. The flame retardant composition of claim 7, wherein the second polycarbonate polymer is a bisphenol-A homopolymer.

9. The flame retardant composition of claim 7, wherein the second polycarbonate polymer is a copolymer containing repeating units derived from 1,1-bis(4-hydroxyphenyl)-1-phenyl-ethane.

10. The flame retardant composition of claim 9, wherein the second polycarbonate polymer contains from about 15 wt % to about 30 wt % of bromine.

11. A flame retardant composition, comprising,
a first polycarbonate polymer having repeating units derived from a monomer having the structure of Formula (A) or Formula (B):

Formula (A)

Formula (B)

wherein
R and R' are $C_2$-$C_{15}$ alkyl;
m, n, p, and q are each 0 or 1, m+n=1, and p+q=1; and
E is $C_1$-$C_{15}$ alkyl;
a second polycarbonate polymer; and
a flame retardant additive,
wherein the second polycarbonate polymer also has repeating units derived from the monomer of Formula (A) or Formula (B), the first polycarbonate polymer having a higher weight-average molecular weight than the second polycarbonate polymer.

12. The flame retardant composition of claim 11, wherein the weight ratio of the first polycarbonate polymer to the second polycarbonate polymer is from about 15:85 to about 99:1.

13. The flame retardant composition of claim 1, wherein the repeating units derived from the monomer of Formula (A) or Formula (B) are from about 0.25 mole % to about 5 mole % of the composition.

14. A flame retardant composition, comprising:
a first polycarbonate polymer having repeating units derived from a monomer having the structure of Formula (A) or Formula (B):

Formula (A)

Formula (B)

wherein
R and R' are $C_2$-$C_{15}$ alkyl;
m, n, p, and q are each 0 or 1, m+n=1, and p+q=1; and
E is $C_1$-$C_{15}$ alkyl;
a flame retardant;
a second polycarbonate polymer which is a bisphenol-A homopolymer; and
a third polycarbonate polymer which is a copolymer containing repeating units derived from bisphenol-A and from tetrabromobisphenol-A.

15. The flame retardant composition of claim 14, containing
from about 20 parts to about 80 parts by weight of the first polycarbonate polymer;
from about 10 parts to about 60 parts by weight of the second polycarbonate polymer; and
from about 1 part to about 2 parts by weight of the third polycarbonate polymer.

16. The flame retardant composition of claim 11, wherein the composition contains from about 0.05 wt % to about 0.5 wt % of the flame retardant additive.

17. The flame retardant composition of claim 1, wherein the flame retardant additive is a salt of diphenylsulfone-3-sulfonic acid or a salt of perfluorobutane sulfonic acid.

18. The flame retardant composition of claim 1, wherein an article molded from the composition can attain UL94 V0 performance at a thickness of 2.0 mm.

19. The flame retardant composition of claim 1, wherein an article molded from the composition can attain UL94 V0 performance at a thickness of 1.5 mm.

20. The flame retardant composition of claim 1, wherein the composition has a melt volume rate (MVR) of from about 3 cm³/10 min to about 25 cm³/10 min, when measured according to ASTM D1238-10, 6 minute dwell.

21. The flame retardant composition of claim 1, wherein the first polycarbonate polymer further comprises repeating units derived from bisphenol-A and repeating units derived from a branching agent comprising trishydroxyphenylethane, the branching agent making up from about 0.01 mole % to about 0.5 mole % of the repeating units in the first polycarbonate polymer.

* * * * *